Figure 1:
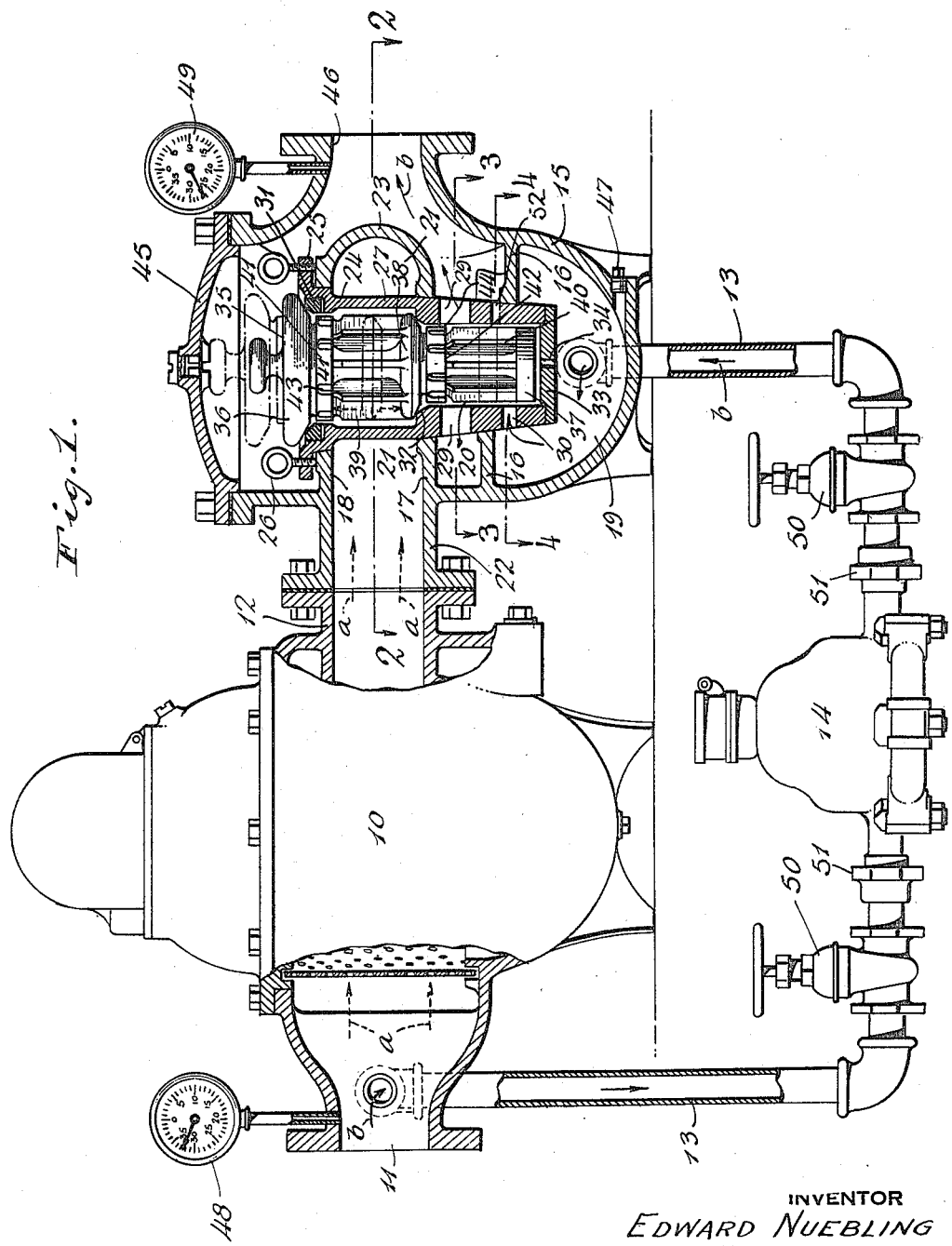

Sept. 26, 1933.  E. NUEBLING  1,928,433
CONTROLLING VALVE FOR COMPOUND WATER METERS
Filed July 24, 1929  2 Sheets-Sheet 1

INVENTOR
EDWARD NUEBLING
BY
ATTORNEYS

Sept. 26, 1933.  E. NUEBLING  1,928,433
CONTROLLING VALVE FOR COMPOUND WATER METERS
Filed July 24, 1929  2 Sheets-Sheet 2
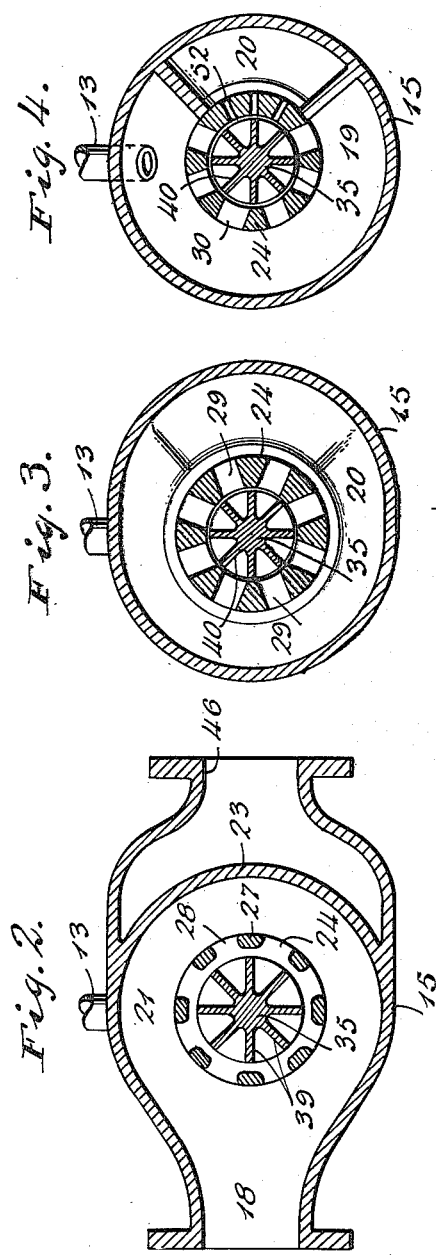
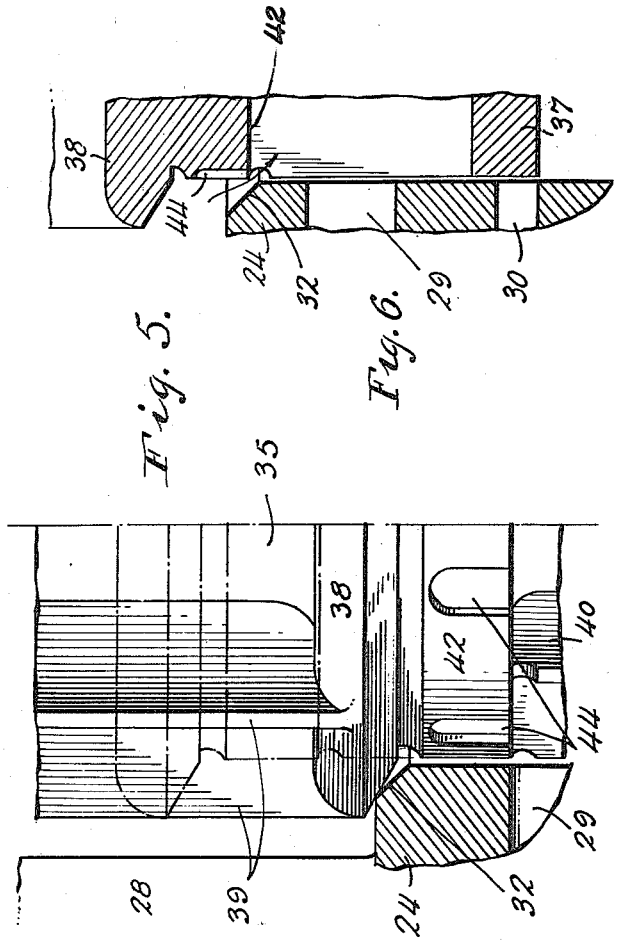
INVENTOR
EDWARD NUEBLING
BY
Lotka, Kehlenbeck & Harley
ATTORNEYS Patented Sept. 26, 1933

1,928,433

UNITED STATES PATENT OFFICE 1,928,433

CONTROLLING VALVE FOR COMPOUND WATER METERS

Edward Nuebling, New York, N. Y.

Application July 24, 1929. Serial No. 380,488

12 Claims. (Cl. 73—167)

This invention relates to water meters and particularly to that type thereof known as compound meters wherein a pair of independent measuring or recording meters are employed, one for measuring the large flows of water and the other for measuring small flows.

Although the different types of water meters in actual use for measuring the flow of water through service pipes to dwellings, manufacturing plants etc., generally operate to measure accurately the water which flows through such pipes, it has been found that when the rate of flow falls below about one-twentieth the normal capacity of the meter, it begins to lose in accuracy and continues to lose as the flow is decreased until a flow is reached that is too small to be measured. The size of the stream which can pass through any meter is proportional to the size of the meter and while in the smaller sizes of meters such as used in dwellings the unmeasured flows are practically negligible, such flows with larger size meters are of considerable magnitude, particularly in places where the demand for water varies widely. In such places, a single meter of sufficient capacity for the large flows would not measure or would measure in part only the small flows, therefore it is the practice in these locations where flows through the meter can not be confined to rates falling within the accuracy limits of a single meter to employ a compound meter. The compound meter consists of the combination of a large or main-line meter, a small or by-pass meter and a controlling valve mechanism for automatically directing small flows through the by-pass meter and large flows through the main line meter. When the controlling valve is closed, all of the water is passed through the by-pass meter, but when the flow through the by-pass becomes large enough to create a fixed difference in pressure between the inlet and outlet sides of said valve, it will open automatically to permit the water to flow through the main line meter; when the flow again decreases the valve will close automatically. If the controlling valve at any time permits a flow of water through the main line meter at a rate too small to be measured obviously the compound meter as a whole will not register accurately.

Great difficulty has heretofore been encountered in constructing a controlling valve that would function satisfactorily over the rates of flow at which the change over from by-pass meter to main line meter or vice versa occurs. Hence the standard specifications for water meters adopted by the New England and American Water Works Associations allow an error of 15% in registration over a large range in rates of flow for the change over zone of any compound meter. This acknowledged inaccuracy of compound water meters as heretofore constructed is highly objectionable, particularly as there are many compound meter installations where the water is used for prolonged periods at the change-over rates.

In view of the above the principal object of the present invention is to provide a new and improved construction of a controlling valve for compound water meters that will function with marked accuracy at the change-over rates as well as at rates above or below change-over.

Another object is to provide a valve of the character described of simple and durable construction, capable of being manufactured and sold at a relatively low cost and of withstanding long periods of service without frequent attention, adjustments or repairs.

A further object is to provide such a valve with means for instantly diverting the flows from by-pass meter to main-line meter or vice versa while preventing the passage of flows through the main-line channels that are too small to be measured by the main-line meter.

Another object is to provide such a valve with an arrangement of by-pass pistons and ports that function to stop the flow of the water through the by-pass meter during the change-over from by-pass to main-line but that permits the flow through the by-pass after an appreciable rate of flow through the main line meter has been established.

A further object is to construct the movable valve seating member as a combined valve and piston having a plurality of differential surface areas against which the pressures prevailing in the valve are exerted in alternation to secure instantaneous opening and closing of the valve at accurately predetermined changes in the pressure conditions.

Another object is to so construct the movable valve member that it will be operated by relatively small pressure differences thereby reducing the total pressure loss through the valve and a further object is to obviate pressure pulsations and possible fluttering of the valve which if present might permit flows to occur through the main line meter at rates too small to be registered accurately.

The above and other objects of the invention will appear more fully from the following more detailed description and by reference to the accompanying drawings wherein Fig. 1 is a view of an installation including a main line meter, a controlling valve constructed in accordance with the present invention and a by-pass line with a by-pass meter, the compounding valve and a portion of the main line meter and by-pass line being shown in vertical section and the remainder of the by-pass line, main line meter and the by-pass meter being shown in elevation, Figs. 2, 3 and 4 are sections on the lines 2—2, 3—3 and 4—4 of Fig. 1, and Figs. 5 and 6 are enlarged details of a portion of the valve showing different positions of the valve plug.

As shown in Fig. 1 the numeral 10 indicates a main line meter of any suitable or well known construction which is provided with the usual flanged inlet 11 and outlet 12. Communicating with the inlet 11 is one end of a small by-pass conduit 13 containing a by-pass meter 14 and communicating at its other end with the interior of the controlling valve, the latter being indicated generally by the reference character 15.

A plurality of partition walls 16, 17 and 18 extend horizontally across the interior of the casing of the valve 15 and divide it into a plurality of compartments 19, 20 and 21. The compartment 21 is of annular shape and forms a continuation of and is in line with the flanged inlet 22, with which it communicates at one end, while at its other end it is closed by the wall 23.

The horizontal partition walls 16, 17 and 18 are provided with axially aligned bores in which is seated a valve cage or bushing 24 preferably provided at its upper end with a projecting annular flange 25 through which eye-bolts 26 or the like are threaded to permit the removal of the valve cage to be readily effected for inspection or repairs. That portion of the valve cage which lies between the walls 17 and 18, in alignment with the compartment 21, is formed with longitudinal ribs 27 between which passages 28 are formed as shown best in Fig. 2. Between the walls 16 and 17 the valve cage 24 is provided with a row of horizontal ports 29, while below the wall 16, said cage is provided with ports 30. Just above the ribs 27 an adjustable valve seating ring 31 is screwthreaded into the cage 24 while just below said ribs the cage 24 is reduced in diameter and is provided with an annular shoulder 32 for a purpose presently to be described. At its lower end the cage is closed by a plate 33 provided with a small central aperture 34.

Mounted for vertical sliding movement within the cage 24 is a valve plug 35 having at the top thereof a disc 36, at the bottom thereof a disc 37, and at the center a disc 38. For convenience the discs will be hereinafter referred to as valve pistons. Between the discs 36 and 38 and 38 and 37 respectively the valve plug is provided with longitudinally extending ribs 39 and 40 which serve to hold the plug in proper alignment. The outer lower edge of each of the valve pistons 36 and 38 is chamfered preferably at an angle of approximately 30° with the horizontal while the oppositely facing edges of the valve ring 31 and shoulder 32 are chamfered at an angle of approximately 45° in order to secure line contact valve seating surfaces between the pistons 36, 38 and said ring 31 and shoulder 32 respectively, and to keep said line contact valve seating surfaces away from the inner peripheral edges of the seating rings.

Line contact, as above set forth, eliminates the effect of variable static pressure in the operation of the valve, and also prevents any accidental denting of the inner peripheral edges of the seating rings, which may result while inserting the valve plug into the cage, from affecting the operation of the valve. Another advantage of having the line contact valve seating surfaces away from the inner peripheral edges of the seating rings is that the forces due to the water pressure which actuate the valve plug can be utilized to better advantage as will appear hereinafter. Immediately below the valve pistons 36, 38 the valve plug is provided with the depending skirt portions 41 and 42 which are provided respectively with grooves 43, 44 for a purpose which will presently appear.

The top of the casing of the valve 15 is preferably closed by a detachable closure 45 and said casing is also provided with the usual flanged outlet 46. A clean out hole provided at the bottom of the valve casing is closed by a plug 47. Pressure gauges 48, 49 may be connected with the inlet 11 of the main meter and with the outlet 46 of the valve 15 and shut-off valves 50 and unions 51 may be arranged in accordance with the usual practice in the by-pass line 13 for permitting the ready removal of the by-pass meter for replacement or repairs.

The operation is as follows: When there is no flow through the compound meter the valve plug 35 is seated by its own weight in the full line position shown in Fig. 1; as all parts of the installation would be under the same pressure the gauges 48 and 49 would then read the same. When a flow of water is started by the opening of a control valve on the outlet side of the compound meter, the flow therethrough will obviously be through the channel that offers the least resistance. The valve plug 35 resting on its seats 31, 32, prevents flow through the main-line channels and the water will therefore at first flow through the by-pass 13, meter 14, the ports 30 in the cage 24 to the outlet 46 as indicated by the full line arrows b. Whenever the amount of water being used is such as to bring about a predetermined difference in the pressure conditions between the outlet 46 and inlet 11 as indicated by the pressure gauges 48 and 49 of, say, seven pounds per square inch, the valve plug 35 will be lifted from its seat. As the plug rises the by-pass disc piston 37 will move across the ports 30 thus automatically stopping the flow through the by-pass and diverting it through the main-line meter 10; in actual operation this takes only a fraction of a second, the entire flow of water being so diverted as soon as it reaches a rate that can be accurately measured by the main line meter. Increase of the flow will cause the valve plug to assume different positions until the top of the plug comes in contact with the valve cover as shown in dotted lines in Fig. 1.

In some installations where large flows are used continuously night and day it may be desirable in order to keep the by-pass meter 14 lubricated, to permit flow through the by-pass when the valve plug is in the full open position, this may be effected by drilling one or more holes 52 on the outlet side of the valve cage as indicated in Figs. 1 and 4 so that a continual small flow will pass through the by-pass system.

In order that the constructional principles which govern the automatic functioning of the valve plug may be better understood the following discussion is included:

Let the weight of the plug 35 in water=W.
The difference in horizontal area between upper and lower valve seat contact circles, 36—31 and 38—32 respectively = differential area A.

The difference in horizontal area between upper and lower depending skirt portion 41, 42 respectively = differential area A'.

The area of the by-pass valve piston 37 = A''.

The difference in pressure between inlet and outlet sides of the controlling valve indicated by pressure gauges 48, 49 = differential pressure, P.

With the valve in the closed position shown in full lines in Fig. 1, the pressure of the water in the compartment 21 is exerted downwardly on the top of the valve piston 38 and upwardly on the bottom of the valve piston 36 within the valve seat contact circles. The diameter of the upper valve seat contact circle being larger than the diameter of the lower valve seat contact circle, the unbalanced forces due to the water pressure, when there is flow through the by-pass channels, are exerted upwardly on an area which in amount is equal to the result obtained by subtracting the area of the lower contact circle from the area of the upper contact circle, this difference between the areas of the upper and lower valve seat contact circles being the differential area A. The pressure of the water in outlet side 46, which is virtually the same as the pressure in all parts of the valve outside of the compartment 21, is exerted upwardly on the bottom of the valve piston 38 and downwardly on the top of the valve piston 36 within the valve seat contact circles, the unbalanced forces due to the pressure being exerted downwardly on an area equal to the difference in horizontal area between the upper and lower valve seat contact circles, or again differential area A. Obviously when the valve is closed the pressure in chamber 21 is the same as in the inlet 11, while the pressure in the outlet 46 and within the chambers 19 and 20 depends on the rate of flow through the by-pass. The difference between these pressures as shown by the readings of the gauges 48 and 49 is the differential pressure P which acting on the differential area A tends to raise the valve plug from its seat. The condition existing at such time is represented by the formula $PA = W$. So long as PA remains less than W the valve remains closed. When $PA = W$, the forces balance and as soon as PA becomes greater than W the valve plug will be raised. When the valve is raised slightly from its seat the contact seal is broken and the unbalanced forces are then exerted on the depending skirt portions of the valve piston or on differential area A'.

The opening of the valve tends to create pressure pulsations with a resultant possible fluttering of the valve, which generally permits water to flow through the main line meter at rates too small to be registered accurately. In order to obviate possible fluttering of the valve, the differential area A' is made somewhat larger than A, so that the instant the contact seal of the valve is broken the differential pressure P is immediately transferred to the larger differential area A' and the valve plug rises instantly. The relation between differential areas A and A' may be expressed by the formula $(C-C') < (d-d')$ in which C = area of upper valve seat contact circle; C' = area of lower valve seat contact circle; d = area of upper depending skirt portion; and d' = area of lower depending skirt portion. $C-C' = A$ and $d-d' = A'$. Obviously if A' is greater than A, then with the same differential pressure a greater force will be exerted upwardly on A' than on A. The unbalanced forces due to the water pressure do not act upon the depending skirt portion until the contact seal is broken on account of the clearances between the skirt portions and the valve seat rings. These clearances are sufficiently large to transmit the pressures when the valve is seated, but are too small to affect the differential pressure after the contact seal is broken. As the plug rises it carries the by-pass piston 37 upwardly causing the latter to close the by-pass ports 30 so that the entire flow is diverted instantly from the by-pass conduit and meter to the main line channel and meter. With the closing of the by-pass a different relation between the differential pressure, area and weight of the valve plug is established. A new effective upward force is introduced which is equal to the pressure transmitted from the inlet 11 through the by-pass conduit 13 multiplied by the area of the by-pass piston 37. The new relation may be expressed by the formula $$P(A' + A'') = W.$$

Since A'' is much larger than A' only a small differential pressure P is required to balance the weight of the valve plug. It will thus be seen that the construction has the important advantages that the total pressure loss through the compound meter is materially reduced, and better control on descending rates of flow is obtained.

The valve is so constructed that the sharp lower edge of the depending skirt portion 42 reaches the inner edge of the chamfered valve seat ring 32 (Fig. 6) at the same instant that the sharp lower edge of the depending skirt portion 41 reaches the inner edge of the chamfered valve seat ring 31. The flow through the valve is therefore divided into two equal parts one part seeking the outlet 29 under piston 38 and the other part seeking the outlet over piston 36. The pressure effect when the valve is open is expressed by the equation $P(A' + A'') = W$ and to satisfy this equation P must have a definite value corresponding to the dimensions and weight of the valve plug. For any given valve plug properly proportioned the required differential pressure is automatically created by the plug itself which in actual operation first opens with somewhat of a popping action and then immediately settles and automatically assumes a position in which the annular openings including the horizontal areas of the grooves 43, 44 are of a size to create a throttling action which will produce the necessary pressure loss or differential pressure to satisfy equation $P(A' + A'') = W$. As the flow through the valve is increased the plug rises and the openings become larger but the pressure loss remains substantially constant until the maximum valve opening is reached after which the pressure loss varies as the square of the velocity of flow.

When the valve is not in full open position the area of the annular openings is small as compared with the approach and discharge channels and the flow through the annular openings follows the law of the flow of water through submerged orifices. Therefore the height of the valve plug above its seat can be predetermined for any given rate of flow. Thus it is possible with a valve constructed in accordance with the principles of the present invention to compute accurately the area of the grooves 43, 44 in the valve pistons so as to cause the valve to close at a rate well within the accuracy limits of the main line meter. If such grooves, or their equivalent, were not provided the valve plug would not close on descending rates of flow until the flow virtually reached zero, since the throttling action, which creates the pressure loss required to satisfy the equation $P(A'+A'')=W$ would continue indefinitely. The grooves are of such area that with a given rate of flow through the main line meter the necessary pressure loss to satisfy the equation $P(A'+A'')=W$ cannot be produced, $P(A'+A'')$ is therefore less than W and the valve closes. For the higher rates $P(A'+A'')$ is greater than W and the valve remains open. Before the valve is fully seated the by-pass piston 37 in its downward movement opens the ports 30 and re-establishes the condition expressed by the $PA'=W$ equation.

The diameters of the depending skirt portions 41, 42 and of the ribs 39, 40 are so proportioned relatively to the diameters of those portions of the cage 24 with which they co-operate as to permit free axial movement of the valve plug 35 while maintaining it in proper alignment with the valve seats. The lengths of said skirt portions are such that the ports 30 are fully closed by the by-pass valve piston 37 just before the plug, in its upward movement, reaches a position such that the annular openings hereinbefore referred to are established. The combined cross sectional area of the grooves 43, 44 is not large enough to permit a flow through the grooves of sufficient volume to effect the differential pressure established by the flow through the by-pass channels and the differential pressure necessary to break the contact seal and start the valve plug in motion will be exerted on the differential area A' as soon as the contact seal is broken. Since differential area A' is greater than differential area A the effect of the differential pressure on the greater differential area is to give the valve plug an upward impulse, furthermore as the plug rises and closes by-pass ports 30 an additional force is exerted upwardly upon the by-pass piston before the annular openings between the valve plug and its ring seats are established and since no appreciable flow through the valve can occur to alter the differential pressure until the annular openings are established the valve will rise instantly a sufficient distance to establish such openings upon the breaking of the circular sealing contacts.

In addition to its other functions the piston 37 in co-operation with the cylinder located at the lower end of the valve cage 24, serves as a dash pot to prevent shock and damage to the seating surfaces of the cage 24 and plug 35 upon the closing of the valve.

It will thus be seen from the foregoing that the invention herein disclosed enables a controlling valve to be constructed that will prevent the flow of water through the main line meter, either on ascending or descending rates of flow, at rates too small to be measured accurately; that the construction of the valve is simple and durable, that pressure losses through the valve are reduced to a minimum and that pressure pulsations and fluttering of the valve plug are entirely eliminated.

While the valve herein disclosed forms a satisfactory constructional example embodying the principles of the invention that has operated successfully, it will be understood that the invention is not limited to the specific constructional details described and illustrated but that many changes, variations and modifications may be resorted to without departing from such principles.

I claim:—

1. In a controlling valve for compound water meters, a casing having a valve cage provided with a spaced series of ports, a valve plug movably mounted within said cage, said plug having a plurality of spaced valve pistons, and said cage having a plurality of spaced valve seats with which said pistons co-operate along line contacts to form a fluid tight seal, skirt portions depending from at least two of said valve pistons and projecting beyond said valve seats in the closed positions of said pistons, said line contacts of said pistons and said depending skirt portions being constructed and arranged to present to the water flowing to said valve different differential surface areas when said valve is in opened and in closed positions.

2. A controlling valve for compound water meter installations that include a main line meter, a by-pass conduit and a by-pass meter, and wherein said valve is responsive automatically to direct the flow through said main line or said by-pass conduit and meter in accordance with the variations in the rates of flow characterized by said valve having a movable valve plug provided with a plurality of spaced valve pistons and a by-pass piston which present progressively different differential surface areas to the water pressure in the closed, the partially opened and the fully opened positions of said valve.

3. In a controlling valve for compound water meters, which include a main line and a by-pass meter, and means for diverting the flow of water from said by-pass to said main line meter and vice versa in accordance with variations in the rate of flow, while preventing flows through said main line meter at rates too small to be measured accurately, said means comprising a movable valve plug having a plurality of spaced valve pistons, skirt portions depending from at least two of said valve pistons, a cage, and a plurality of ring seats on said cage with which said pistons engage with circular line contacts spaced from the inner peripheral edges of said ring seats when said valve is in closed position, said skirt portions presenting to the water, when said valve is in opened position, a differential surface area of greater extent than is included within said circular line contacts.

4. In a controlling valve for compound water meters, which include a main line and a by-pass meter, and means for diverting the flow of water from said by-pass to said main line meter and vice versa in accordance with variations in the rate of flow, while preventing flows through said main line meter at rates too small to be measured accurately, said means comprising a movable valve plug having a plurality of spaced valve pistons, skirt portions depending from at least two of said valve pistons, a cage, and a plurality of ring seats on said cage with which said pistons engage with circular line contacts when said valve is in closed position, said skirt pistons presenting to the water, when said valve is in opened position, a surface area of greater extent than is included within said circular line contacts and said plug being provided adjacent to said pistons with means to control accurately the closing of the valve on descending rates of flow within definite predetermined limits.

5. In a controlling valve for a compound water meter which includes a main line meter and a by-pass meter, a valve cage having a pair of spaced valve seating surfaces and a piston chamber provided with a series of valve ports, and a valve plug movably mounted in said valve cage, said plug having a pair of valve pistons adapted to co-operate with said valve seating surfaces and a third piston connected with said plug and mounted to move within said chamber in operative relation to said ports for controlling the by-pass system.

6. In a controlling valve for a compound water meter which includes a main line meter and a by-pass meter, a valve cage having a pair of spaced valve seating surfaces and a piston chamber having between its ends a plurality of horizontally alined by-pass valve ports, and a valve plug having a pair of spaced valve pistons for co-operation with said valve seating surfaces and a by-pass valve piston mounted within said chamber and adapted to close said ports, the relative spacing of said valve seating surfaces, said valve ports, and said by-pass and valve pistons being such that a free opening of said valve can not occur until said by-pass ports are closed by said by-pass valve piston.

7. In a controlling valve, a valve casing having an inlet and an outlet, a valve plug having a plurality of pistons movably mounted in the casing and adapted to be opened automatically by a predetermined difference in pressure between the water at the inlet and outlet, and means for securing an instantaneous opening of the valve upon the breaking of its contact seal, said means comprising skirt portions depending from the pistons and having a differential area greater in amount than the differential area of said pistons.

8. In a controlling valve for a compound water meter that includes a main line meter and a by-pass meter, a valve casing having an inlet and an outlet, a valve plug movably mounted in said casing for automatically controlling the flow through said main line meter or said by-pass meter in accordance with pressure differences between said inlet and outlet, a by-pass cylinder having ported communication through said by-pass meter with said inlet and a by-pass valve piston mounted in said cylinder and adapted to close said ported communication during the opening of said valve, and said piston opening said ported communication after flow is established through said main line meter for permitting substantially the full pressure of the water at said inlet to be exerted on said piston to hold said valve plug in open position.

9. In a controlling valve including a chamber, a valve cage having a pair of spaced valve seating rings, a valve plug movably mounted in said chamber, said plug having a pair of spaced valve pistons having seating surfaces for co-operation with said valve seating rings and means comprising skirt portions depending from said valve pistons and having a differential area greater in amount than the differential area of said valve seating surfaces for securing instantaneous opening of the valve upon the breaking of its contact seal.

10. In a controlling valve, a valve cage provided with a pair of chamfered ring seats, a valve plug having a pair of valve pistons adapted to seat upon said ring seats the edges of said pistons being chamfered at a different angle from the angle of chamfer of said ring seats whereby a line sealing contact between said valve pistons and ring seats is secured and said valve plug being provided adjacent to said pistons with depending skirt portions, said skirt portions being provided with means to permit only a restricted flow of water past said plug after the line sealing contact of said valve has been broken and until said plug has been moved to a predetermined opened position.

11. In a controlling valve for a compound water meter that includes a main line meter and a by-pass meter, a valve casing having an inlet and an outlet, a valve plug movably mounted in said casing for automatically controlling the flow through said main line meter or said by-pass meter in accordance with pressure differences between said inlet and outlet, a by-pass cylinder having ported communication through said by-pass meter with said inlet and a by-pass valve piston mounted in said cylinder and adapted to close said ported communication during the opening of said valve, and said piston opening said ported communication after flow is established through said main line meter for permitting substantially the full pressure of the water at said inlet to be exerted on said piston to hold said valve plug in open position, said by-pass cylinder being further provided with outlet ports adapted to be opened when said valve plug is in full open position for permitting a lubricating flow through said by-pass meter during the time large flows are passing through the main line meter.

12. In a controlling valve, a valve casing having an inlet and an outlet, a valve cage in said casing and provided with valve seating surfaces, a valve plug having co-operating valve seating surfaces mounted for vertical movement within said valve cage and normally held by the force of gravity in closed position, said valve plug being movable automatically to opened position when a predetermined pressure difference is established between said inlet and outlet, and means for causing a smaller predetermined differential pressure to hold said valve plug in opened position, said means including a by-pass cylinder and a by-pass piston carried by said valve plug.

EDWARD NUEBLING.